(12) United States Patent
Nichols

(10) Patent No.: US 8,702,304 B2
(45) Date of Patent: Apr. 22, 2014

(54) TEMPERATURE INDICATORS UTILIZING TRACE MATERIALS

(76) Inventor: Bruce W. Nichols, Dallas, TX (US)

( * ) Notice: Subject to any disclaimer, the term of this patent is extended or adjusted under 35 U.S.C. 154(b) by 254 days.

(21) Appl. No.: 13/047,773

(22) Filed: Mar. 14, 2011

(65) Prior Publication Data

US 2012/0234227 A1 Sep. 20, 2012

(51) Int. Cl.
*G01K 7/00* (2006.01)
(52) U.S. Cl.
USPC .......................................... 374/152; 374/141
(58) Field of Classification Search
USPC .................................................. 374/152, 141
See application file for complete search history.

(56) References Cited

FOREIGN PATENT DOCUMENTS

| DE | 32 29 020 A1 | 2/1984 |
| EP | 0 092 027 A2 | 10/1983 |
| FR | 2 487 115 A1 | 1/1982 |
| WO | PCT/IB2011/000523 | 9/2011 |

OTHER PUBLICATIONS

Translation of DE3229020, of the reference cited in the IDS filed Mar. 5, 2013—Feb. 9, 1984.*

* cited by examiner

*Primary Examiner* — Mirellys Jagan
(74) *Attorney, Agent, or Firm* — Dickstein Shapiro LLP

(57) ABSTRACT

Methods and systems for determining when an electrical contact reaches the maximum allowable temperature. The methods and systems include defining a plurality of temperature indicators installed in at least one surface of the electrical contact to indicate at least one specific temperature; providing a trace material within the at least one temperature indicator; allowing the electrical contact to reach the at least one specific temperature at which the at least one temperature indicator is designed to activate in or on the at least one surface of the electrical contact; causing the trace material to disperse from the at least one temperature indicator into a surrounding environment; and monitoring the surrounding environment to determine when a predetermined quantity of the trace material has dispersed into the surrounding environment, thereby indicating that the electrical contact has reached the at least one specific temperature at which the at least one temperature indicator is designed to activate.

12 Claims, 8 Drawing Sheets

TEMPERATURE INDICATORS UTILIZING TRACE MATERIALS

COPENDING APPLICATION

This application claims priority benefit of U.S. Provisional Application Ser. No. 61/313418 entitled "Heat Activated Temperature Indicator", filed on Mar. 12, 2010, having the same inventor of the instant patent application and of which is incorporated herein by reference as if set forth in full below.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The invention relates in general to electrical switches, on load tap changers, circuit breakers, reclosers, and more particularly to electrical contacts and electrical switches utilizing the same.

Electrical switches that operate while under load (with current flowing) are susceptible to certain limits at which further use will result in equipment failure. For example, components that overheat during normal equipment operation will, at some point, reach a limit at which they must be replaced. This condition can also have catastrophic consequences and has the potential for failure of valuable infrastructure assets and loss of life. The overheating of the electrical contacts causes failure of switches or deteriorated switch operation and otherwise generally reduces or limits the useful lives of the switches themselves. The degree of deterioration from overheating is a function of the various conditions that exist during operation, such as the amount of current carried by the contacts, the voltage applied across the contacts, the maximum temperature experienced, along with the severity of service under which the contacts operate. In addition, overheating of electrical contacts can signal failure or malfunction of other switch components. Switches are also subject to overheating from a high resistive contact interface. Excessive heating of contacts or other switch components can dramatically change the electrical and mechanical characteristics of the contacts and the ability of the switch to properly operate. Further, it can cause carbon accumulation (coking), and failure of the switch through an inability to operate or a type of failure known as a "flash-over".

As a result of the consequence described, utility companies spend hundreds of thousands of dollars annually and commit a considerable amount of human resources to monitor their high voltage electrical equipment for signs of abnormal conditions that indicate overheating is occurring and failure is possible or imminent.

There are four basic environments within which electrical contacts operate: (1) air; (2) inert gas; (3) oil; and (4) within a vacuum. Electrical contacts are used for low, medium and high voltage equipment, including circuit breakers, transformer and regulator load tap changers, and reclosers. These contacts operate under oil, under pressurized gas (e.g., SF6), in an enclosure open to ambient air, or under vacuum. Electrical contacts that operate under oil or gas do so within a containment vessel or compartment, preventing easy access to the contacts. As such, regardless of the type of environment in which contacts and other components operate, they operate within some form of enclosure. Each of these environments presents challenges to the contact monitoring process.

Because overheating of electrical contacts cannot be eliminated, users of switches must monitor the switch to detect when the switch experiences overheating to a predetermined critical point as prescribed by the utility or end user. Monitoring of the switch for overheating includes: Sampling the surrounding oil, sampling the gasses in the headspace above the oil, or sampling the primary gas and performing dissolved gas analysis (DGA) through the use of gas chromatography; the use of Infrared scanning of the external surfaces of the switch containment vessel or compartment, and; the use of external temperature monitors to detect the temperature of the containment vessel or compartment, and internal temperature sensors that measure the temperature of the oil.

A transformer has two sets of wire coils, known as the primary windings and the secondary windings. A voltage applied to the primary windings (also referred to herein as the "primary voltage") will induce a voltage in the secondary windings (also referred to herein as the "secondary voltage"). The secondary voltage is typically higher or lower than the primary voltage, depending upon the relationship of the number of turns, or coils, and of wire in the primary and secondary windings of the transformer. A transformer with a greater number of coils in the secondary windings will produce a secondary voltage higher than the primary voltage. A transformer without taps, or access points, in the secondary windings will produce only one secondary voltage for each primary voltage. Many examples of transformers have numerous taps in the secondary windings so a variety of secondary voltages may be selected from one transformer. A transformer which has taps in the secondary windings will allow several secondary voltages to be accessed, depending upon which tap is selected. One transformer may be used to both decrease and increase voltage, if it is tapped at points lower and higher in number than the number of turns in the primary windings. A "coil tap selector switch" or a "load tap changer" must be provided, however, to switch between the various secondary winding taps.

A "load tap changer" is a mechanical device that moves a moving electrical contact to different stationary tap contacts within the switch, depending on the voltage output required. Current practices, however, include the application of advanced diagnostic tools and have resulted in extending the maintenance interval with little or no regard to the number of operations.

Some of the methods used previously to monitor electrical equipment performance which attempted to overcome the effort and expense required by direct physical inspection include the following:

1. Dissolved Gas Analysis (DGA)

Dissolved gas analysis is used for monitoring the condition of electrical contacts that operate in an oil environment. The method includes extracting a sample of the oil surrounding the contacts and analyzing it using gas chromatography to determine the amounts and correlation of key gasses generated during operation. The resulting values, collectively, is indicative of various types of problems that may be occurring within the equipment. For example, the presence of acetylene dissolved in the oil is indicative of arcing, and its correlation to ethylene is a key consideration for detecting overheating and coking. This process, however, lacks the precision necessary to determine the point at which overheating reaches the temperature at which failure is possible or imminent as the tests are performed intermittently and failures continue to occur as a result.

2. Infrared Monitoring

Infrared monitoring may be used in an air, inert gas, vacuum, or oil environment. The method includes the use of an infrared camera to monitor the external temperature of high voltage equipment. Temperature and resistance are directly related. As resistance to current flow through electrical equipment increases, the temperature of the oil also increases. The infrared camera measures in a general sense the temperature increases and alerts the user accordingly. However, this system is inexact because it cannot monitor the temperature of contacts or other components separately from other neighboring components within the enclosure. As a result, the utility does not know what components will require replacement when the switch is opened for repair.

3. Temperature Differential Monitoring

Temperature Differential Monitoring consist of temperature sensors applied directly to the outside surfaces of both the switch compartment and the outside of the main transformer tank. Temperature sensors attach to instrumentation that measures and logs the temperature in real time. Most utility companies schedule internal inspection when the temperature differential between the switch compartment and the main transformer tank reaches 10° C.

The above diagnostic methods have proven to be useful in a general sense for identifying overheating and coking. These methods, however, do not have the ability to distinguish when the contacts have overheated to their limit of service life or that failure of the switch is possible or imminent. In addition, typical sampling intervals also present the possibility that oil analysis could not detect an upset condition prior to failure. Peak efficiency can only be achieved where a method exists that provides detection of overheating of electrical contacts when they have reached a prescribed temperature.

Accordingly, there exists in the industry a need to provide a temperature indicator for electrical contacts that will provide a means of detecting overheating and provide an indication to users that a certain critical temperature has been reached.

SUMMARY

The aforementioned problems, and other problems, are reduced, according to exemplary embodiments, by a plurality of temperature indicators that are designed to activate by exposing and detecting trace materials when the critical temperature of components is reached.

In an exemplary embodiment, a temperature indicator is provided for an electrical contact to indicate the heating of the electrical contact operating in, but not limited to, oil, inert gas (e.g., SF6), air, and vacuum environments. The temperature indicator containing a trace material is attached to or within a surface of the electrical contact or other component. The temperature indicator consists of a tubular shaped body with a spring loaded pointed penetrator held into the compressed position using a metallic solder composition with a melting point (i.e., liquidus temperature) corresponding to the temperature at which the utility has prescribed. When the contact or component reaches the temperature corresponding to the melting point of the metallic solder, the solder reaches liquidus temperature and releases the penetrator. At that point, the compressed spring is released and activates ejecting the penetrator into the container of the trace material. The trace material is then dispersed into the oil and through vaporization, the gas space above the dielectric oil, or, for electrical contacts that operate within a gas environment, into the gas.

In an exemplary embodiment, nanocrystals are provided for use as a trace material implant of a temperature indicator, installed in an electrical contact. And, the use of different nanocrystals that emit light frequencies that are readily distinguishable from that of the surrounding oil makes them desirable to be used as a trace material.

In another exemplary embodiment, multiple temperature indicators with different retaining solders and/or trace materials are installed in electrical contacts in different areas of the switch to detect different temperatures of the electrical contacts. For example, multiple temperature indicators with different trace material implants are installed in an electrical contact to detect one or more temperatures.

The foregoing has outlined rather broadly the features and technical advantages of the present invention so that the detailed description that follows may be better understood. Additional features and advantages of the invention will be described hereinafter which form the subject of the claims of the invention. It should be appreciated by those skilled in the art that the conception and the specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE DRAWINGS

The accompanying drawings, which are incorporated in and form a part of the specification, illustrate embodiments of the present invention, and, together with the description, serve to better explain the principles of the invention. It is to be noted that the drawings illustrate only typical embodiments of the invention and are therefore not to be considered limiting of its scope, for the invention will admit to other equally effective embodiments.

DESCRIPTION

Figure 1:
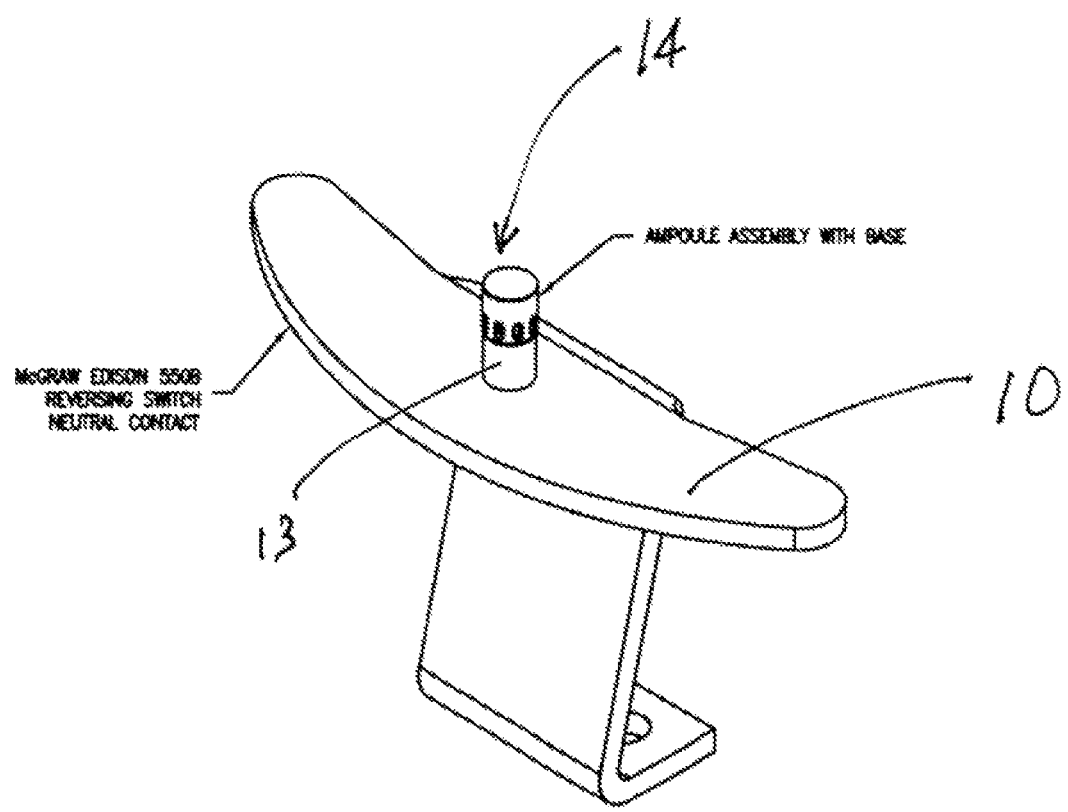
FIG. 1 illustrates a perspective view of an electrical contact with an installed temperature indicator, in accordance with some exemplary embodiments of the present invention.
Figure 2B:
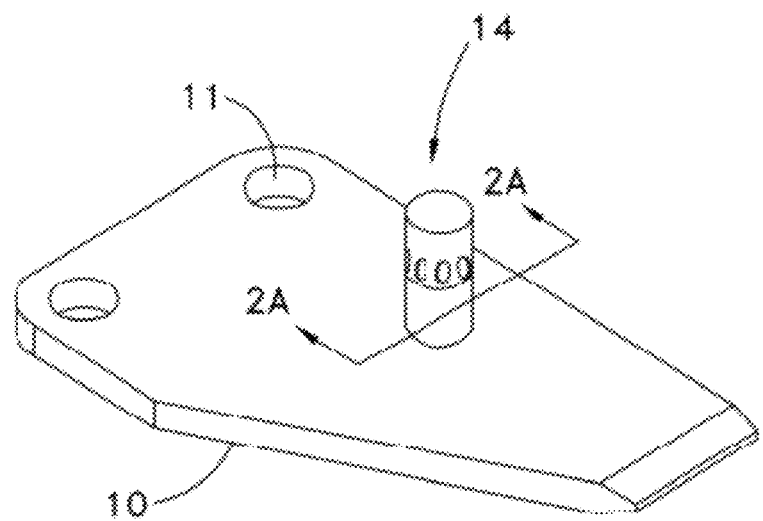
FIG. 2 illustrates a perspective view of the electrical contact and a partial section view of the electrical contact with the installed temperature indicator, taken along line 2A-2A, in accordance with some exemplary embodiments of the present invention.
Figure 2A:
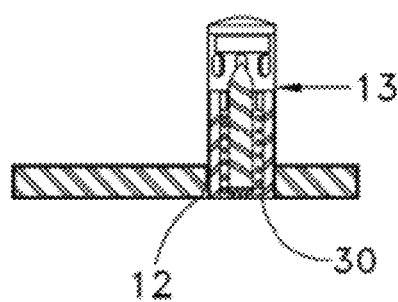
Figure 3:
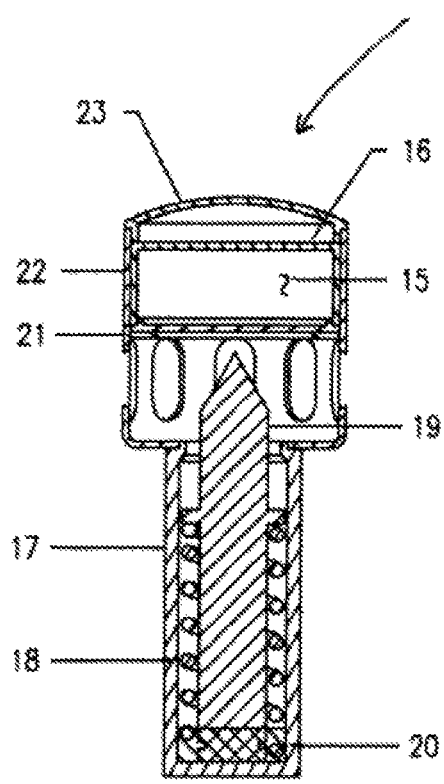
FIG. 3 illustrates a cross section view of the temperature indicator showing a penetrator, a compression spring, a penetrator retention solder, a body, and a trace material container, prior to activation of the penetrator, in accordance with some exemplary embodiments of the present invention.

This invention now will be described more fully hereinafter with reference to the accompanying drawings, in which exemplary embodiments are shown. This invention may, however, be embodied in many different forms and should not be construed as limited to the embodiments set forth herein. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or perspective views illustrating some of this invention. The functions of the various elements shown in the figures may vary in shape, attachment, size, and other physical features. Those of ordinary skill in the art further understand that the exemplary systems, and/or methods described herein are for illustrative purposes and, thus, are not intended to be limited to any particular named manufacturer or other relevant physical limitation (e.g., material).

Heating of electrical contacts can be attributed to a variety of circumstances but in most instances is a result of high current loading or infrequent operation. For these reasons, it is necessary that a reliable device and method be provided that will allow the utility to react to heating events in a timely manner. With reference now to FIGS. 1-4 in conjunction, there is depicted an electrical contact 10 preferably made of copper, although any electrically conductive material may be used. The electrical contact 10 is used in a reversing switch such as that for coil tap selectors or load tap changers used on high voltage transformers or step voltage regulators. One or more reversing switch electrical contacts are provided for each phase of the load tap changer. A second part of the electrical contact 10, not shown in the accompanying figures, is used to make contact with the neutral, raise, and lower contacts, depending on the voltage required by the user. The reversing switch of which the electrical contact 10 is a part, often switches between raise and lower contacts. The electrical contact 10 may be provided with one or more mounting holes 11 for mounting to the conductive contact support.

The electrical contact 10 also comprises one or more threaded holes, or bores disposed therein the surface. A threaded hole or bore 12 is formed in the electrical contact 10 such that it is threaded or sized to provide for an interference fit to ensure secure engagement contact with an internal surface of the hole 12. The hole 12 may also be contained within an extended surface boss 13 attached to the contact surface by brazing, riveting or other desired means known to one skilled in the art that will provide engagement contact and heat transfer. To allow for ease of manufacture, the hole 12 is preferably, but is not limited thereto, cylindrically shaped as a result of drilling, although any shape of hole 12 may be used. The hole 12 contains a bottom 30 which may be flat, tapered or conical, depending on the method used to form the hole 12. After the hole 12 is created, a temperature indicator 14 is threaded, pressed or otherwise inserted into the hole 12 and maintained in engagement position by the threading or interference fit. The temperature indicator 14 comprises therein a container, or ampoule 16 which comprises a trace material 15.

The temperature indicator 14 comprises a copper barrel 17, a high temperature compression spring 18, a penetrator 19, a penetrator retention solder 20, an insulating ring 21, an ampoule or container 22, the trace material 15, and a top cover 23. According to some of the embodiments, the container 22, is provided with a foil covered opening disposed directly above the penetrator 19. As the foil covered opening of the container 22 is pierced by the penetrator 19 the trace material 15 comes into communication with and is dispersed into the environment surrounding the electrical contact 10. When the presence of the trace material 15 is detected, as described below, in the environment in which the electrical contact 10 is operated, it signifies that inspection and corrective action is required.

The trace material 15 used is preferably composed of, but not limited to, 19.1 oPDCH (1.2 perfluorodimethylcyclohexane), 19.2 PDCB (1,2 & 1,3 perfluorodimethylcyclobutane-magnesium, or nanocrystals. Detection of the dispersion of the trace material 15 within the oil or gas space above the oil, gas, air, or vacuum environment surrounding the electrical contact 10 can be accomplished using existing spectrophotometric chromatography techniques or using electrochemical transducers. These techniques of detecting the trace material 15 may be employed remotely, in a manner similar to DGA testing, in which the contents of the enclosure surrounding the electrical contact 10 are periodically sampled and tested by any of the foregoing or other equivalent techniques for the presence of the trace material 15. Alternatively, numerous portable and online methods may be used including sampling of the gasses in the gas space above the oil or the use of electrochemical transducers mounted within the enclosure in substantially continuous contact with the contents of the enclosure, allowing either a remotely or locally situated detector operatively connected to the transducers to signal detection of the presence of the trace material 15. One skilled in the art will recognize that other detection techniques are available and that may be developed and can be used for detection of the trace material.

Detection of the presence of the trace material 15 thus indicates that the electrical contact 10 has reached the pre-set temperature dictated by sublimation of the penetrator retention solder 20. Additional and alternative temperatures may be selected if desired, by the selection of a different penetrator retention solder with higher or lower melting or liquidus temperature. Additional or fewer holes 12 could also be provided, or the electrical contact 10 may include pairs of holes 12. The penetrator retention solder 20 is preferably composed of a Tin-Lead or Bismuth-Indium based composition and formulated or selected such that substantially all of the quantity contained in the copper barrel 17 transforms from a solid to the liquid phase at a selected temperature to release the spring-loaded penetrator 19, to pierce the foil covered opening of the trace material container 22 comprising the trace material 15 and to be detected. The electrical contact 10 is, therefore, preferably contained in oil, to allow ready diffusion of the trace material 15 from the electrical contact 10. Once released from the trace material container 22, the trace materials 15 diffuse into the immediately surrounding oil environment. It also vaporizes into the gas space above the oil. Other operating environments may be used upon selection of the proper trace materials and detection techniques. When the presence of the trace material 15 is detected by the detection means appropriate with the environment in which the electrical contact 10 is operated, or in the gas space above the oil, replacement of the contacts or inspection of the switch within which the electrical contact 10 operates is indicated.

Figure 4B:
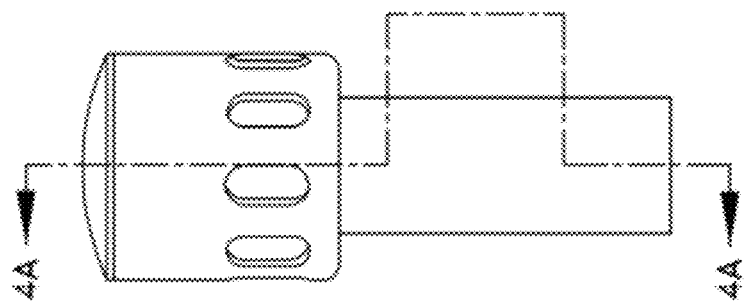
FIG. 4 illustrates a side view and along cutaway line 4A-4A of a portion of the temperature indicator depicting the emission of a trace material upon liquefaction of the penetrator retention solder and activation of the compression spring, in accordance with some exemplary embodiments of the present invention.
Figure 4A:
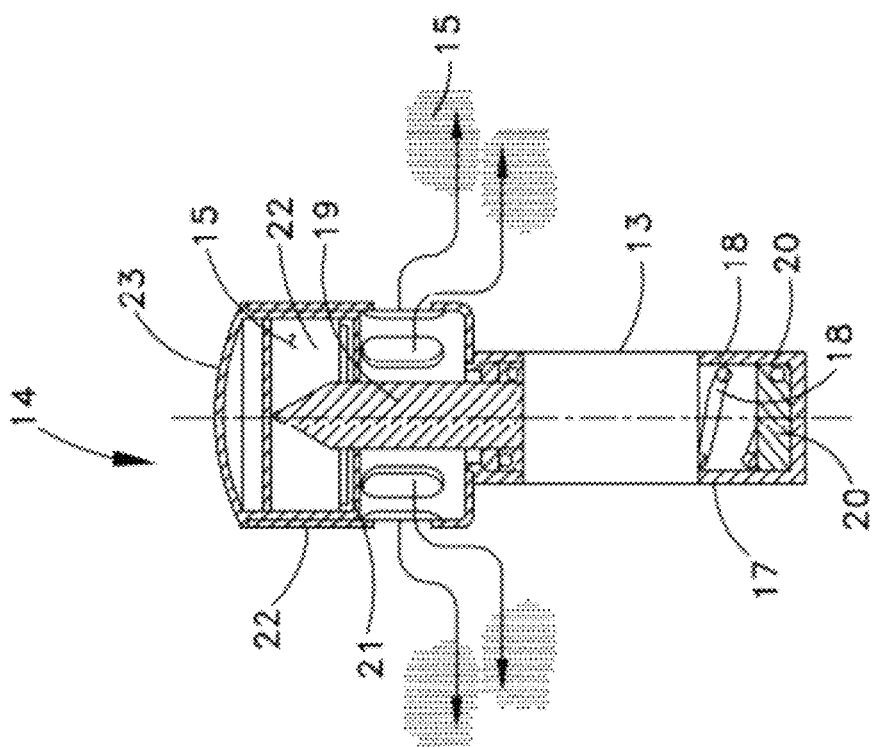

In accordance with one embodiment of the invention, the copper barrel 17 is partially filled with the penetrator retention solder 20 having a melting point of 124° C. Detection of the presence of trace material 15 from the temperature indicator 14 would thus indicate that the electrical contact 10 had reached the predetermined temperature of 124° C. in operation. Additional and alternative temperatures could be predetermined, if desired, by the selection of different penetrator retention solder with higher or lower melting points. Additional or fewer holes 12 could also be provided. The trace materials 15 may also be placed into containers which are attached to the electrical contact 10. Turning now to FIG. 4, the temperature indicator 14 is shown in a side view and as a cutaway along line 4A-4A and depicts released trace material 15 from the trace material container 22 upon penetration of the foil covered opening by the penetrator 19. As described above, the penetrator 19, activates with a spring released force and pierces the foil covered opening of the trace material container 22 only after the penetrator retention solder 20 has melted upon reaching its melting point, thus releasing retention of the penetrator 19 and causing the trace material 15 to be dispersed into the existing environment through the pierced foil covered opening of the trace material container 22.

It will be apparent to one of ordinary skill in the art that the temperature indicator 14 described with reference to FIGS. 1-4 could be used in other components in order to detect heating.

Figure 5:
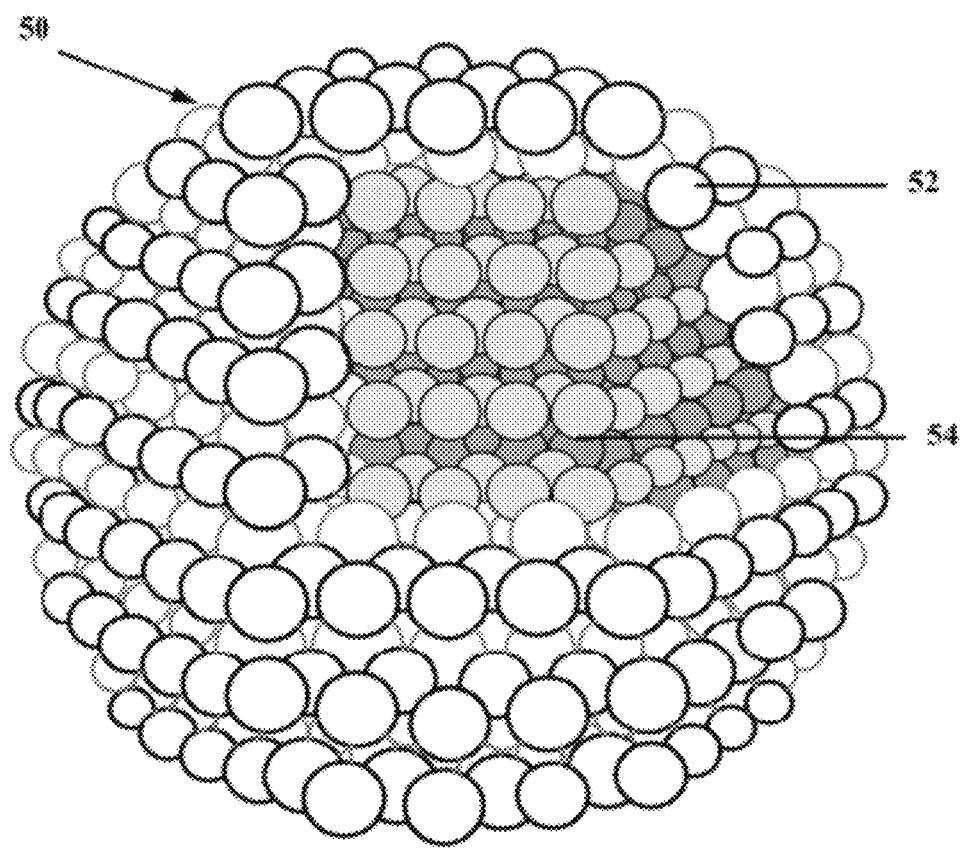
FIG. 5 illustrates a composition of a core-shell nanocrystal used as a trace material implant, in accordance with some exemplary embodiments of the present invention.

FIG. 5 illustrates a composition of a plurality of nanocrystals 50 used as trace materials in accordance with some exemplary embodiments of the present invention. The nanocrystals 50 are "core/shell" nanocrystals, which consist of a core 52 of Cadmium Selenide (CdSi) and a shell 54 of Zinc Sulfide (ZnS). The nanocrystals 50 are man-made semiconductor crystalline material with 7 nanometers in diameter. Since the diameter of each one of the nanocrystals 50 is less than 10 nanometers, the nanocrystals 50 are referred to as quantum dots. What makes nanocrystals particularly desirable as one kind of trace material implant is their ability to emit light of varying frequencies as determined by size that are readily distinguishable from that of the surrounding oil.

The nanocrystals 50 are encapsulated in a transparent cross-linked polymer coating that is impervious to acid and dissolved gases in the oil. The coating may also includes paramagnetic properties that will allow removal of the nanocrystals 50 after breaching using electromagnetic filtration. This allows the nanocrystals 50 to be concentrated for detection and subsequently be removed from the oil after breaching.

Figure 6A:
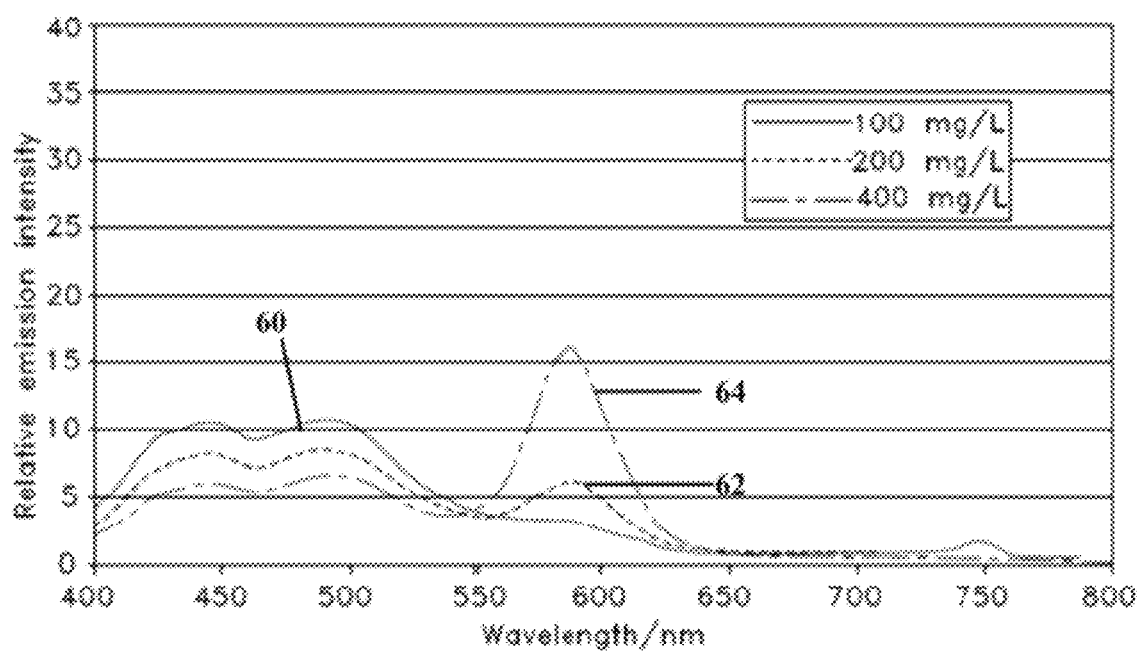
FIG. 6A illustrates three emission spectrums of oil with three different nanocrystal concentrations when the excitation wavelength of the contained nanocrystals is 380 nm, in accordance with some exemplary embodiments of the present invention.

FIG. 6A illustrates three (3) emission spectrums of oil with three different nanocrystal concentrations when the excitation wavelength of the contained nanocrystals is 380 nm, in accordance with some exemplary embodiments of the present invention. More specifically, it shows an emission spectrum 60 of oil with a nanocrystal concentration at 100 mg/L, an emission spectrum 62 of oil with a nanocrystal concentration at 200 mg/L, and an emission spectrum 64 of oil with a nanocrystal concentration at 100 mg/L, while the excitation wavelength of the contained nanocrystals is 380 nm. According to FIG. 6A, as the optical density increases, the oil absorbs the excitation wavelength of 380 nm which prevents the contained nanocrystals from receiving the light they need to fluoresce.

Figure 6B:
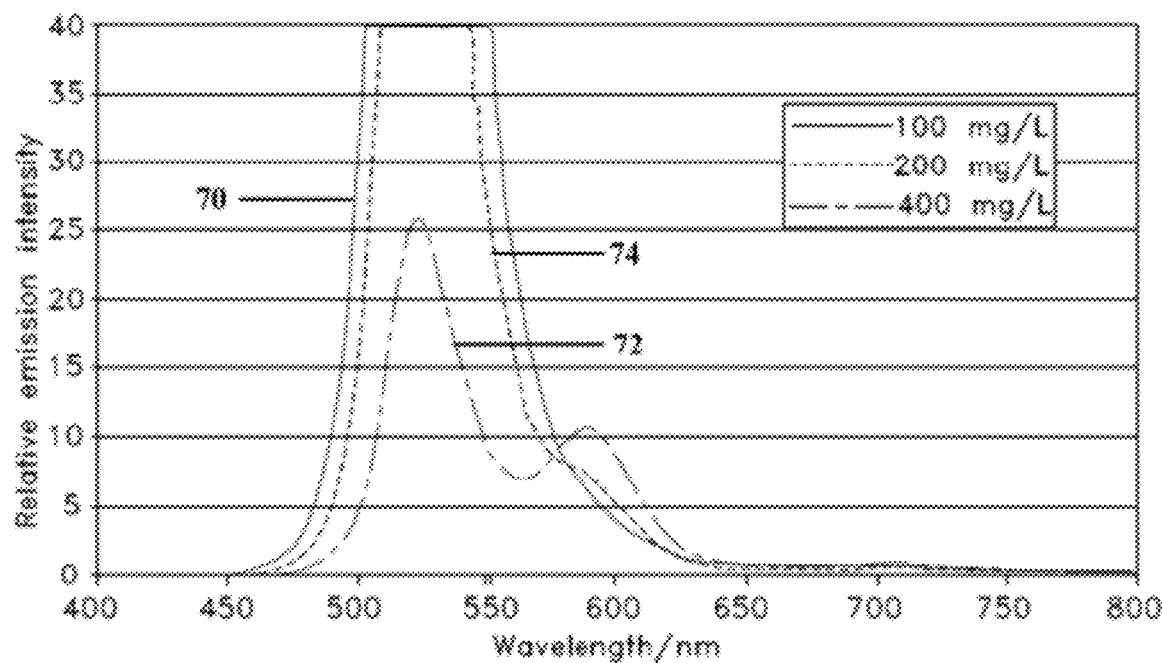
FIG. 6B illustrates three emission spectrums of oil with three different nanocrystal concentrations when the excitation wavelength of the contained nanocrystals is 518 nm, in accordance with some exemplary embodiments of the present invention.

FIG. 6B illustrates another three emission spectrums for three different nanocrystal concentrations when the excitation wavelength of the nanocrystals is 518 nm, in accordance with some exemplary embodiments of the present invention. More specifically, it shows an emission spectrum 70 of oil with a nanocrystal concentration at 100 mg/L, an emission spectrum 72 of oil with a nanocrystal concentration at 200 mg/L, and an emission spectrum 74 of oil with a nanocrystal concentration at 100 mg/L, while the excitation wavelength of the contained nanocrystals is 518 nm. As shown in FIG. 6B, an excitation light source of wavelength 518 nm is able to pierce the optical density of the oil even when the nanocrystal concentration is 100 mg/L. So using the nanocrystals of excitation wavelength 518 nm as trace materials allows them to be detected at lower concentrations. And the lower nanocrystal concentrations equate to a lower cost for the end product.

Figure 7:
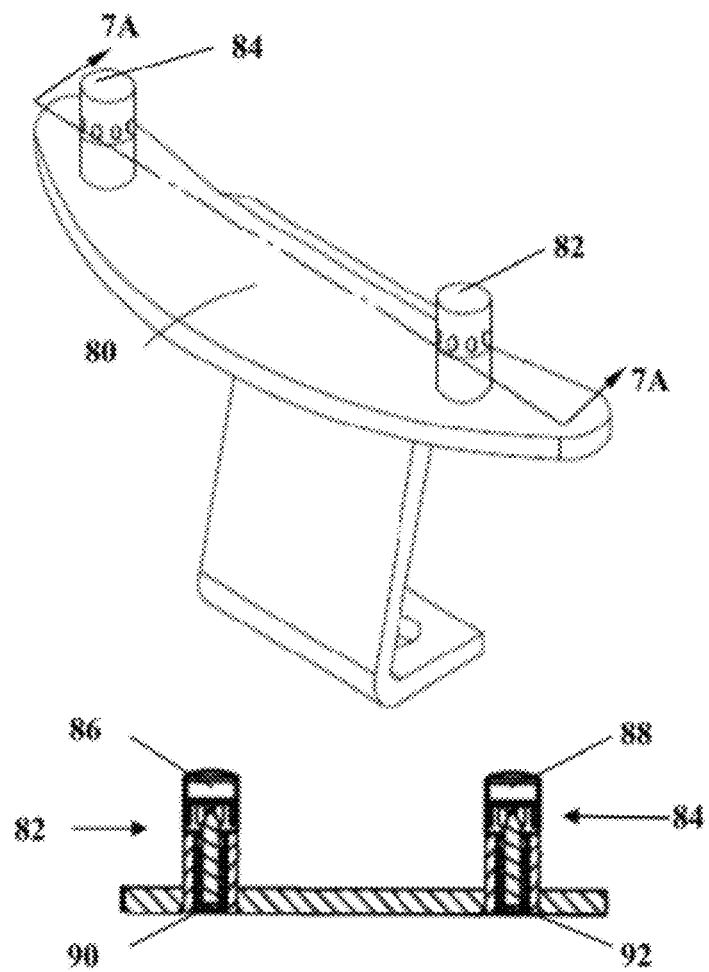
FIG. 7 illustrates a perspective view of an electrical contact installed with two temperature indicators and a partial section view of the electrical contact with the installed temperature indicators, taken along line 7A-7A, in accordance with some exemplary embodiments of the present invention.

There are many materials (e.g. perfluorocarbon chemicals, etc.) that may be used as a trace material. As a result, this invention is able to use different materials for multiple temperature indicators in an electrical contact to indicate different temperatures of the electrical contact. For example, multiple temperature indicators with different trace materials may be installed in an electrical contact to identify the detections of one or more temperatures, such as a slightly overheated temperature of 100° C., an intermediate temperature of 124° C. and higher temperatures of 149° C. and 199° C. FIG. 7 illustrates a perspective view of an electrical contact 80 installed two temperature indicators and a partial section view of the electrical contact 80 with the installed two temperature indicators, taken along line 7A-7A, in accordance with some exemplary embodiments of the present invention. A temperature indicator 82 contained one kind of trace material 86 and another temperature indicator 84 contained another kind of trace material 88 are installed in the electrical contact 80. The temperature indicator 82 is filled with a penetrator retention solder 90 having a melting point at temperature T1, while the temperature indicator 84 is filled with another penetrator retention solder 92 having another melting point at temperature T2. These two temperature indicators are installed to indicate two different temperatures T1 and T2 for the electrical contact 80. The detection of trace material 86 indicates the electrical contact 80 reaches the temperature T1, and the detection of trace material 88 indicates the electrical contact 80 reaches the temperature T2. In this way, multiple temperatures are detected for an electrical contact. This is desirable as temperature T1 provides an indication that the electrical contact has reached a temperature above normal. As indicated earlier, one of the reasons reversing switch contacts overheat is due to infrequent operation. Many utility companies have schedules to operate the reversing switch "through neutral" to "wipe" or break-up surface oxides that develop over time due to infrequent operation. The temperature T1 could be an indicator that the switch needs to be operated to restore its rated current capacity. It would follow that the utility would be aware the load tap changer had the occurrence of slightly elevated temperature and would thus observe more closely its operation. It would also provide the opportunity to order replacement parts in preparation for an inspection that would be triggered by the activation of the temperature indicator indicating that temperature T2 had been reached. At temperature T2 failure of the switch is possible or imminent.

While the invention has been particularly shown and described with references to a preferred embodiment thereof, it will be understood by those skilled in the art that various changes in form and details may be made therein without departing from the spirit and scope of the invention.

What is claimed is:

1. A method for determining when an electrical contact reaches at least one specific temperature, the method comprising:
   providing at least one electrical contact surface;
   providing at least one temperature indicator installed in or on the at least one electrical contact surface to indicate at least one specific temperature;
   providing a trace material within the at least one temperature indicator;
   allowing the at least one electrical contact to reach the at least one specific temperature at which the at least one temperature indicator is designed to activate in or on the at least one electrical contact surface;
   causing the trace material to disperse from the at least one temperature indicator into a surrounding environment; and
   monitoring the surrounding environment to determine when a predetermined quantity of the trace material has dispersed into the surrounding environment, thereby indicating that the at least one electrical contact has reached the at least one specific temperature at which the at least one temperature indicator is designed to activate; and
   wherein the at least one temperature indicator further comprises a spring loaded penetrator; and
   wherein the method for determining when the electrical contact reaches the at least one specific temperature further comprises the steps of holding the spring loaded penetrator in a compressed, charged position, and causing the spring loaded penetrator to move to a discharged position, and wherein the step of causing the spring loaded penetrator to move to the discharged position occurs subsequent to the step of holding the spring loaded penetrator in the compressed, charged position, the step of causing the spring loaded penetrator to move to the discharged position occurs in response to the at least one electrical contact reaching the at least one specific temperature, and the step of causing the trace material to disperse from the at least one temperature indicator into the surrounding environment occurs in response to the spring loaded penetrator moving to the discharged position.

2. The method of claim 1 wherein the spring loaded penetrator further comprises a pointed penetrator, and wherein the method further comprises the steps of providing the trace material within a container, and causing the pointed penetrator to penetrate the container, as the spring loaded penetrator moves to the discharged position, and wherein the step of causing the trace material to disperse from the at least one temperature indicator into the surrounding environment occurs in response to the pointed penetrator penetrating the container.

3. The method of claim 2 wherein the step of monitoring further comprises using Gas Chromatography (GC), GC with electron capture detection (GC-EC), Non-dispersive Infrared (NDIR), Fourier transform infrared spectroscopy, Gas chromatography-mass spectrometry (GC-MS) or Photo-acoustic Spectrometry (PAS) to identify when a sufficient quantity of trace material has dispersed into the surrounding environment to indicate that the at least one electrical contact has reached the at least one specific temperature at which the at least one temperature indicator is designed to activate.

4. The method of claim 2 wherein the step of monitoring further comprises using non-dispersive infrared monitoring to identify when a sufficient quantity of trace material has dispersed into the surrounding environment to indicate that the at least one electrical contact has reached the at least one specific temperature at which the at least one temperature indicator is designed to activate.

5. The method of claim 2 wherein the step of monitoring further comprises using on-line monitoring of a fluorescence emitted by the trace material.

6. The method of claim 2 wherein the trace material comprises oPDCH (1,2 perfluorodimethylcyclohexane), PDCB (1,2 & 1,3 perfluorodimethylcyclobutanemagnesium sulfate) or nanocrystals.

7. The method of claim 2, further comprising the step of using a spring to move the spring loaded penetrator to the discharged position, and wherein the step of causing the trace material to disperse from the at least one temperature indicator into the surrounding environment occurs in response to using the spring to move the spring loaded penetrator to the discharged position.

8. The method of claim 7 wherein the step of monitoring further comprises monitoring the surrounding environment to determine when a predetermined quantity of the trace material has dispersed into the surrounding environment, and wherein the surrounding environment includes a gas space above oil.

9. The method of claim 7 wherein the spring is held in a compressed position by a metallic solder composition with a melting point corresponding to the temperature of the electrical contact at which the at least one temperature indicator is designed to activate.

10. A temperature indicator for detecting a specific temperature of an electrical component within a transformer, said temperature indicator comprising:
    a first end configured to be in contact with the electrical component within the transformer;
    a container containing a trace material and having a cover; and
    a middle section located between the first end and the container such that the container is configured to be spaced apart from the electrical component within the transformer;
    wherein the temperature indicator is configured such that the cover of the container is opened, and the trace material is released from the container, when the first end of the temperature indicator reaches the specific temperature;
    wherein the middle section of the temperature indicator includes openings for permitting insulating oil to enter the middle section and for permitting the trace material to flow out of the temperature indicator and into a surrounding environment;
    wherein the middle section of the temperature indicator includes a metal tube; and
    wherein the temperature indicator further comprises a spring-loaded penetrator for piercing the cover of the container when the first end of the temperature indicator reaches the specific temperature, and a spring located within the metal tube for biasing the penetrator toward the cover of the container.

11. A temperature indicator for detecting a specific temperature of an electrical component within a transformer, said temperature indicator comprising:
    a first end configured to be in contact with the electrical component within the transformer;
    a container containing a trace material and having a cover; and a middle section located between the first end and the container such that the container is configured to be spaced apart from the electrical component within the transformer;

wherein the temperature indicator is configured such that the cover of the container is opened, and the trace material is released from the container, when the first end of the temperature indicator reaches the specific temperature; and wherein the temperature indicator further comprises a spring-loaded penetrator for piercing the cover when the first end of the temperature indicator reaches the specific temperature, to thereby open the container.

12. The temperature indicator of claim 11, further comprising solder located within the first end of the temperature indicator, for holding the spring-loaded penetrator in a charged position.

\* \* \* \* \*